Aug. 2, 1938.  P. CARLTON  2,125,541
PISTON RING
Filed July 3, 1936
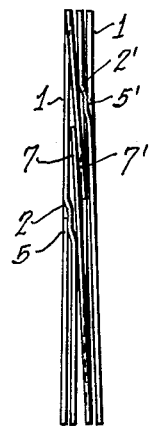
Fig·3·
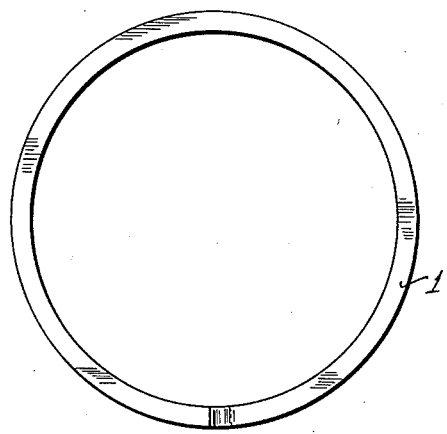
Fig·1·
Fig·2·
Fig·6
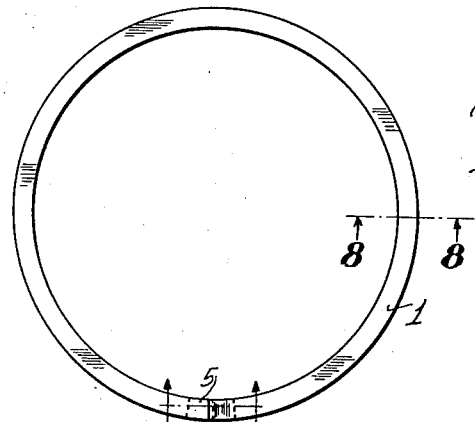
Fig·4·
Fig·5·
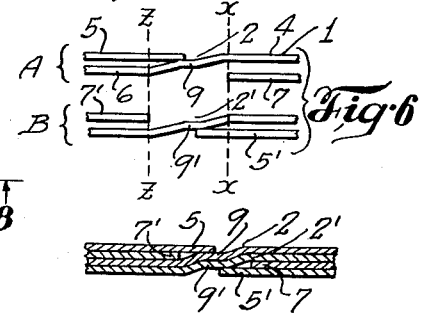
Fig·7·
Fig·8·
INVENTOR
Paul Carlton.
By
ATTORNEY Patented Aug. 2, 1938

2,125,541

UNITED STATES PATENT OFFICE 2,125,541

PISTON RING

Paul Carlton, St. Louis, Mo.

Application July 3, 1936, Serial No. 88,740

13 Claims. (Cl. 309—24)

This invention relates to a new and improved form of piston ring, more particularly to a form of spring-steel piston ring.

It is an object of the present invention to provide a piston ring formed of spring-steel which conforms to circular shape more perfectly.

It is another object of the present invention to provide a spring-steel piston ring which fits the cylinder walls and the piston groove more perfectly and provides a more explosion-tight seal between the piston and cylinder walls.

It is also an object of the present invention to provide a composite spring-steel piston ring which maintains greater bearing surface between the piston and the cylinder wall.

It is a further object of the present invention to provide a spring-steel piston ring which is composite in structure and provides a plurality of cup-shaped spring-steel surfaces which mutually engage each other along the respective edges thereof.

It is likewise an object of the present invention to provide a composite spring-steel piston ring in which a plurality of spring-steel members are interwoven with each other.

It is likewise an object of the present invention to provide a composite spring-steel piston ring which has a continuous cylinder wall-engaging surface around the entire periphery of the cylinder wall.

It is furthermore an object of the present invention to provide a composite spring-steel piston ring which has a new and novel joint member.

Other objects and advantages of the present invention will appear more fully from the following detail description, which, taken in connection with the accompanying drawing, will disclose to those skilled in the art the construction and operation of a preferred form of the present invention.

Figure 1 is a plan view of a single ring-member included in the present invention;

Figure 2 is an elevational view of the ring shown in Figure 1;

Figure 3 is an elevational view of two ring-members such as those shown in Figure 2, at the point during operation of intertwining the two ring-members;

Figure 4 is a plan view of a preferred form of finished piston ring;

Figure 5 is an elevational view of the piston ring shown in Figure 4;

Figure 6 is a schematic partial view of two circular ring-members juxtaposed to show the relationship in the joint portion;

Figure 7 is an enlarged cross-section partial view of the embodiment shown in Figure 4, about the line 7—7 of Figure 4; and Figure 8 is a cross-sectional partial view of the embodiment shown in Figure 4, about line 8—8 of Figure 4.

The embodiment shown in the drawing is formed by fabricating a plurality of helical rings 1 made of flat spring-steel ribbon. These rings form the component parts of the composite piston ring and are spun from a mandrel or formed by some other conventional process. In fabricating the component rings 1, means should be employed such as angularly offsetting the mandrel to impart to the ring a slight amount of concavity when the ring is pressed into a flat circular shape, so that, when in place in the piston, a predetermined amount of cupping action will take place.

The component rings comprise a double helical turn, such as that shown in Figure 2. The intermediate turn 2 of the helix is deformed to a step-like shape such as that shown at 3, so that the intermediate turn will lie in two planes on the respective sides of this deformed portion, and so that the portion 4 of the intermediate turn 2 will lie in substantially the same plane as the top turn of the helix 5. Similarly, the portion 6 of the intermediate turn of the helix will lie substantially in the plane of the bottom coil 7 of the helix. The top coil 5 extends to a point 8 and overlies slightly the straight middle portion 9 of the deformed middle portion 2 of the intermediate turn of the helix. The bottom coil of the helix extends to a point 10, which falls slightly short of the point 9, so that the end of the bottom coil 7 will not overlie the portion 9 of the intermediate turn. This feature may be more clearly seen in Figure 6.

The partial view indicated by the figure A is a single component coil resting as shown in Figure 2. The partial view B is a similar coil turned over on its other side. To indicate the comparison, the similar parts are referred to by similar numbers, using prime marks to differentiate the parts of B from the parts of A.

Referring to the flat middle portion 9 of the intermediate turn 2 of the helix, it will be noted that the top turn of the helix 5 extends past the line z—z and overlies the top of this flat portion 9. The bottom coil 7 of the helix, however, terminates substantially at the line x—x, which line passes through the point at which the intermediate turn 2 of the helix makes its second bend and comes into the plane of the top coil 5. Similarly, the line z—z passes substantially through the point where the intermediate turn 2 of the helix is bent and brought into the plane of the bottom coil 7 of the helix.

The second component coil shown at B in Figure 6, as has been above pointed out, is identical with the coil shown at A, except that it is turned over in a position so that the so-called top coil of the helix in reality becomes the bottom coil 5', and conversely, the so-called bottom coil of the helix becomes the top coil 7'. It will be noted that in this reversed position, the coil 7' now extends only up to the line z—z and does not overlie the middle section 9' of the intermediate coil 2', whereas the bottom coil 5' now extends past the line x—x and does overlie the middle portion 9' of the intermediate coil 2'.

It will be noted that, by taking two identical coils and reversing them with respect to each other, it is possible to juxtapose the two short ended coils 7 and 7', respectively. With the coils in this juxtaposed position, the member 7 and the member 7' are pulled away from the body and inserted behind each other substantially as shown in Figure 3. In this position, the two helixes are turned in opposite directions with respect to each other, thereby being threaded into each other. This action is continued until the middle portions 9 and 9', respectively, become superimposed, as shown in Figure 5.

In a composite ring as shown in Figures 4 and 5, it will be noted that the short end of the one turn underlies the long end of the other turn. When the ring is compressed to conform to the inside of a cylinder, the ring will assume a uniformly circular shape and the end members of the helical parts thereof will move inwardly along the step-like center portion and upwardly thereon. As the ring is compressed, the cupping action above mentioned takes place and provides a structure having a cross-section such as that shown in Figure 8, wherein the two interior adjacent steel surfaces form a V, the open end of which is disposed radially outwardly of the ring, whereas the two adjacent top steel surfaces and the two adjacent bottom steel surfaces correspondingly form, in cross-section, a V, the open side of which is disposed radially inwardly of the ring.

Thus it will be seen that, by reason of the cupping action, the four layers of spring-steel ribbon each becomes non-parallel to each adjacent layer of steel ribbon, and are in contact along either an interior or exterior circumferential edge. As this cupping action takes place, the ring obviously increases in thickness. Therefore, it is desirable that this increase in thickness be accompanied by a suitable increase in thickness at the lapping joint contiguous to the steplike center portion 2 of the ring. It will be observed that this will take place automatically. As the ring is compressed into a smaller circumferential size, the free ends at the top and bottom of the component parts will slide respectively toward the flat middle portions 9 and 9' of the intermediate turn and axially outwardly along the diagonal step-like portions, thereby providing a ring of substantially uniform effective thickness throughout.

Piston rings made in accordance with the present invention are found to be exceedingly durable by reason of the fact that they can be fabricated from spring-steel ribbon, rather than from cast metal. This provides a ring in which there is less crystallization, more malleability, and less surface hardness. Consequently, a piston ring made according to the present invention engages the cylinder wall surface tightly without danger of scoring or otherwise damaging it.

Furthermore, piston rings made according to the present invention have been found to be far more leak-proof than piston rings which have been manufactured up to the present time. This is thought to be largely attributable to the unique type of lap-joint provided, since the present invention provides a ring which has a continuous circumferential contact with the cylinder wall.

The present ring also provides for a greater number of oil-scraping edges, so that the lubricants which splash up on to the sides of the cylinder wall during normal motor operation will be much more efficiently scraped down from the sides of the walls and returned to the crank case.

It is thought that the invention and numerous of its attendant advantages will be understood from the foregoing description, and it is obvious that numerous changes may be made in the form, construction, and arrangement of the several parts of the invention without departing from the spirit or scope thereof or sacrificing any of its attendant advantages, the form herein described being of preferred embodiment for the purpose of illustrating the invention.

What is sought and claimed for in Letters Patent is as follows—

1. A piston ring comprising a plurality of intertwined helical steel ribbons, each of said ribbons having a deformation in one turn thereof, said deformation having two parallel sections angularly disposed to the plane of the piston ring.

2. A piston ring comprising a plurality of intertwined helical steel ribbons, each of said ribbons having a deformation in one turn thereof, said deformation having two parallel sections angularly disposed to the plane of the piston ring, said parallel sections being joined by an intermediate section which is parallel to the plane of the ring.

3. A piston ring comprising a plurality of intertwined helical steel ribbons, each of said ribbons having a deformation in one turn thereof, said deformation having two parallel sections angularly disposed to the plane of the piston ring, said intertwined ribbons being disposed with respect to each other so that the respective deformations therein are similar and overlying.

4. A piston ring comprising a plurality of intertwined helical steel ribbons, each of said ribbons having a deformation in one turn thereof, said deformation having two parallel sections angularly disposed to the plane of the piston ring, said parallel sections being joined by an intermediate section which is parallel to the plane of the ring, said intertwined ribbons being disposed with respect to each other so that the respective deformations therein are similar and overlying.

5. In a piston ring of the character described, a component ring comprising a flat steel ribbon formed in the shape of a helix having two turns, said two turns being integrally connected by a deformed section, said deformed section comprising two parallel sections which are angularly disposed to the plane of the component ring, said two parallel sections being mutually connected by a section which is parallel to the plane of the component ring.

6. In a piston ring of the character described, a component ring comprising a flat steel ribbon formed in the shape of a helix having two turns, one of said turns lying substantially in one plane and the other of said turns lying substantially in a parallel plane axially disposed from the first plane, said two turns being integrally connected by a deformed section, said deformed section comprising two parallel sections which are angularly disposed to the plane of the component ring, said two parallel sections being mutually connected by a section which is parallel to the plane of the component ring.

7. In a piston ring, a component ring member comprising a flat steel ribbon, said flat steel ribbon being bent in the plane of its widest surface in the form of a circle, said ribbon being deformed upwardly a distance equal to the thickness of the ribbon and then being bent into a plane parallel to the plane of the circle for a short distance to form a one step portion then being disposed upwardly again for a distance equal to the thickness of the ribbon and then being bent finally so as to extend parallel to the plane of the circle, said ribbon thence being bent in the form of a flat circle to overlie the first named circle.

8. In a piston ring, a component ring member comprising a flat steel ribbon, said flat steel ribbon being bent in the plane of its widest surface in the form of a circle, said ribbon being deformed upwardly a distance equal to the thickness of the ribbon and then being bent into a plane parallel to the plane of the circle for a short distance to form a one step portion then being disposed upwardly again for a distance equal to the thickness of the ribbon and then being bent finally so as to extend parallel to the plane of the circle, said ribbon thence being bent in the form of a flat circle to overlie the first named circle, and terminating at a point above the said flat step portion.

9. In a piston ring, a component ring member comprising a flat steel ribbon, said flat steel ribbon being bent in the plane of its widest surface in the form of a circle, said ribbon being deformed upwardly a distance equal to the thickness of the ribbon and then being bent into a plane parallel to the plane of the circle for a short distance to form a flat step portion then being disposed upwardly again for a distance equal to the thickness of the ribbon and then being bent finally so as to extend parallel to the plane of the circle, said final bend being disposed perpendicularly above the point of beginning of the ribbon, said ribbon thence being bent in the form of a flat circle to overlie the first named circle.

10. In a piston ring, a component ring member comprising a flat steel ribbon, said flat steel ribbon being bent in the plane of its widest surface in the form of a circle, said ribbon being deformed upwardly a distance equal to the thickness of the ribbon and then being bent into a plane parallel to the plane of the circle for a short distance to form a flat step portion then being disposed upwardly again for a distance equal to the thickness of the ribbon and then being bent finally so as to extend parallel to the plane of the circle, said final bend being disposed perpendicularly above the point of beginning of the ribbon, said ribbon thence being bent in the form of a flat circle to overlie the first named circle, and terminating at a point above the said flat step portion.

11. In a piston ring, a pair of component ring members each comprising a flat steel ribbon, said flat steel ribbon being bent in the plane of its widest surface in the form of a circle, said ribbon being deformed upwardly a distance equal to the thickness of the ribbon and then being bent into a plane parallel to the plane of the circle for a short distance to form a flat step portion, then being disposed upwardly again for a distance equal to the thickness of the ribbon and then being bent finally so as to extend parallel to the plane of the circle, said final bend being disposed perpendicularly above the point of beginning of the ribbon, said ribbon thence being bent in the form of a flat circle to overlie the first named circle, and terminating at a point above the said flat step portion, said component ring members being reversely intertwined one with the other.

12. A piston ring comprising a pair of helical members each having an upper and a lower turn integrally connected by an intermediate angularly-extending section deformed centrally to provide a flat step-like portion, the upper turn being extended at its free end to overlie said step-like portion, the lower turn being terminated at its free end short of the intermediate section, said helical members being intertwined in such a manner that the respective intermediate sections are in contiguous overlying relationship.

13. A piston ring comprising a pair of helical members each having an upper and a lower turn integrally connected by an intermediate angularly-extending section deformed centrally to provide a flat step-like portion, the upper turn being extended at its free end to overlie said step-like portion, the lower turn being terminated at its free end short of the intermediate section, said helical members being intertwined in a relatively opposite manner such that the respective intermediate sections are in contiguous overlying relationship, and the upper turn of one such member is in contiguous overlying relationship upon the lower turn of the other, and at its free end extending beyond and overlapping the free end of said lower turn.

PAUL CARLTON.